United States Patent Office 2,915,433
Patented Dec. 1, 1959

2,915,433

16-METHYLENE-17β-(α,β-OXIDO-PROPANOYL)-ANDROSTENES

Eugene J. Agnello and Gerald D. Laubach, Jackson Heights, N.Y., assignors to Chas. Pfizer & Co., Inc., New York, N.Y., a corporation of Delaware No Drawing. Application March 23, 1959
Serial No. 800,990

2 Claims. (Cl. 167—65)

This application is concerned with new and useful steroid compounds and with therapeutically useful compositions containing them. More particularly it is concerned with certain steroid compounds unsaturated at the 4-position; the 1 and 4-positions; the 4 and 6-positions or the 1, 4 and 6-positions having a propanoyl oxide function at the 17-position and a 16-methylene substituent. It is also concerned with therapeutically useful compositions containing these compounds together with pharmaceutically acceptable excipients.

The compounds within the purview of this invention include those having the structure.

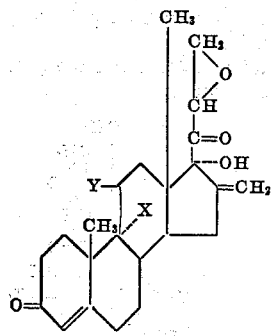

and the $\Delta^1$, $\Delta^6$- and the $\Delta^{1,6}$-dehydro analogs of these compounds wherein X is selected from the group consisting of hydrogen, fluorine, chlorine, bromine, iodine, methoxy and ethoxy groups and Y is keto or β-hydroxy.

Starting compounds which are used in the preparation of the valuable compounds of this invention include those having the formula

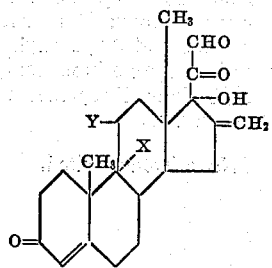

and the $\Delta^1$-, $\Delta^6$- and $\Delta^{1,6}$-dehydro analogs of these compounds. The monohydrate derivatives of these compounds may also be used as starting materials.

The steroid starting materials are prepared in accordance with procedures fully described and illustrated in copending and concurrently filed patent application Serial No. 800,989. This application describes the preparation of the aldehydes by oxidation of the corresponding 21-alcohols with cupric acetate using Weijlard's procedure as set forth in U.S. Patent No. 2,773,078, issued December 4, 1956. The 21-alcohols, in turn, are prepared using the procedure described in U.S. Patent No. 2,865,808, issued December 23, 1958.

For the preparation of the compounds of the instant invention, the selected steroid aldehyde which may be the anhydrous form or the monohydrated form is reacted with diazomethane in a reaction inert solvent at a temperature of from about 0° C. to about 25° C., preferably from about 0° C. to about 15° C. for a period of from about 1 to about 24 hours.

The diazo compound, as is well known, is most conveniently prepared in diethyl ether solution although other solvents have been employed. The solution is then added to the steroid in a suitable solvent. It is preferred that the steroid should be completely soluble in the solvent although this is not absolutely necessary. Suitable solvents for the steroid include polar lower aliphatic oxygenated organic solvents such as alkanols or ethers containing up to five carbon atoms. These include, for example, methanol, ethanol, propanol, butanol, pentanol, diethyl ether, propyl ethyl ether or tetrahydrofuran. It may also be convenient to use a mixture of solvents such as methanol and ether or dioxane and ethanol to enhance solubility.

In preferred practice, the reaction is initiated at about 0° C. and maintained at that temperature for several minutes, that is, about 30 minutes and then at a higher temperature for the balance of the reaction period. Suitable yields, however, can be obtained at any temperature within the disclosed range.

Although it is possible to obtain reaction products using any amount of diazo compound, preferred conditions include the use of at least an equimolar quantity of diazo compound, and for optimum yields, from about 400% excess to about 700% excess of diazo compound is utilized.

At the end of the reaction period, the product may be isolated by evaporation of the solvent and excess diazo compound. The evaporation is preferably carried out in vacuo in order to decrease the possibility of side reactions. Alternatively, the excess diazo compound is destroyed by the addition of dilute acid, for example, 6 N acetic acid and precipitating the product by concentrating the solutions to about 20% of its original volume. The product is recovered by filtration.

To obtain a highly purified form of the 17-propanoyl oxide, the product is taken up in a lower aliphatic halogenated organic solvent such as ethylene dichloride, chloroform or carbon tetrachloride and washed with an alkaline reagent such as an hydroxide, carbonate or bicarbonate of an alkali metal and then with water. The layers are separated and the organic layer dried over an anhydrous salt such as magnesium or sodium sulfate, filtered and evaporated to dryness. The residue is triturated with ether, filtered and dried.

The biologically active compounds of this invention which, as will be noted, may exist in epimeric forms may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosage of hydrocortisone, and these compounds are useful to treat the types of pathological conditions often treated with hydrocortisone. Because of their great adrenocortical activity it is sometimes possible to use dosages of these compounds which are lower than those of hydrocortisone.

For oral administration the compounds may be administered in the form of tablets containing excipients such as starch or milk sugar. Aqueous suspensions and elixirs which may be sweetened or flavored may also be used. To apply these therapeutic agents topically, they may be prepared in the form of ointments and salves in suitable bases especially non-aqueous petrolatum type bases. For intra-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

The following examples are given solely for the purpose of illustration and are not to be construed as limitations of this invention, many apparent variations of which are possible without departing from the spirit or scope thereof.

EXAMPLE I

*16-methylene-17β-(α,β-oxido-propanoyl)-Δ⁴-androstene-11β,17α-diol-3-one*

A solution was prepared containing 1 m mole of 16-methylene-$\Delta^4$-pregnene-11β,17α-diol-3,20-dione-21-al monohydrate in 35 ml. of methanol containing 17.5 ml. of ether. To this solution there was added a diazomethane solution containing 4 m moles of diazomethane in 17.5 ml. of ether. The solution was maintained at 0° C. for 24 hours and the solution evaporated in vacuo. The residue was triturated with ether and the crystalline product recovered by filtration.

The following compounds are similarly prepared using as starting materials the 21-aldehydes prepared in accordance with the procedure described in detail in the above-identified copending and concurrently filed patent application. The list is given to avoid unnecessary repetition of experimental details.

9α-fluoro - 16 - methylene-17β-(α,β-oxido-propanoyl)-$\Delta^4$-androstene-11β,17α-diol-3-one 9α-chloro - 16 - methylene-17β-(α,β-oxido-propanoyl)-$\Delta^4$-androstene-11β,17α-diol-3-one 9α-bromo-16-methylene - 17β - (α,β-oxido-propanoyl)-$\Delta^4$-androstene-11β,17α-diol-3-one 9α-iodo - 16 - methylene - 17β-(α,β-oxido-propanoyl)-$\Delta^4$-androstene-11β,17α-diol-3-one 9α-methoxy - 16 - methylene-17β-(α,β-oxido-propanoyl)-$\Delta^4$-androstene-11β,17α-diol-3-one 9α-ethoxy-16-methylene - 17β - (α,β-oxido-propanoyl)-$\Delta^4$-androstene-11β,17α-diol-3-one 16-methylene - 17β - (α,β-oxido-propanoyl)-$\Delta^{4,6}$-androstadiene-11β,17α-diol-3-one 9α-fluoro - 16 - methylene - 17β - (α,β-oxido-propanoyl)-$\Delta^{4,6}$-androstadiene-11β,17α-diol-3-one 9α - chloro - 16 - methylene-17β-(α,β-oxido-propanoyl)-$\Delta^{4,6}$-androstadiene-11β,17α-diol-3-one 9α - bromo-16-methylene - 17β - (α,β-oxido-propanoyl)-$\Delta^{4,6}$-androstadiene-11β,17α-diol-3-one 9α-iodo - 16 - methylene-17β-(α,β-oxido-propanoyl)-$\Delta^{4,6}$-androstadiene-11β,17α-diol-3-one 9α-methoxy-16-methylene - 17β - (α,β-oxido-propanoyl)-$\Delta^{4,6}$-androstadiene-11β,17α-diol-3-one 9α - ethoxy - 16 - methylene-17β-(α,β-oxido-propanoyl)-$\Delta^{4,6}$-androstadiene-11β,17α-diol-3-one 16-methylene - 17β - (α,β-oxido-propanoyl)-$\Delta^{1,4}$-androstadiene-11β,17α-diol-3-one 9α-fluoro - 16 - methylene - 17β - (α,β-oxido-propanoyl)-$\Delta^{1,4}$-androstadiene-11β,17α-diol-3-one 9α - chloro - 16 - methylene-17β-(α,β-oxido-propanoyl)-$\Delta^{1,4}$-androstadiene-11β,17α-diol-3-one 9α - bromo - 16 - methylene-17β-(α,β-oxido-propanoyl)-$\Delta^{1,4}$-androstadiene-11β,17α-diol-3-one 9α-iodo-16-methylene - 17β - (α,β-oxido-propanoyl)-$\Delta^{1,4}$-androstadiene-11β,17α-diol-3-one 9α-methoxy - 16 - methylene-17β-(α,β-oxido-propanoyl)-$\Delta^{1,4}$-androstadiene-11β,17α-diol-3-one 9α - ethoxy - 16 - methylene-17β-(α,β-oxido-propanoyl)-$\Delta^{1,4}$-androstadiene-11β,17α-diol-3-one 16 - methylene - 17β - (α,β-oxido-propanoyl) - $\Delta^{1,4,6}$-androstatriene-11β,17α-diol-3-one 9α-fluoro - 16 - methylene - 17β - (α,β-oxido-propanoyl)-$\Delta^{1,4,6}$-androstatriene-11β,17α-diol-3-one 9α-chloro - 16 - methylene - 17β - (α,β-oxido-propanoyl)-$\Delta^{1,4,6}$-androstatriene-11β,17α-diol-3-one 9α - bromo - 16 - methylene-17β-(α,β-oxido-propanoyl)-$\Delta^{1,4,6}$-androstatriene-11β,17α-diol-3-one 9α - iodo - 16 - methylene - 17β - (α,β-oxido-propanoyl)-$\Delta^{1,4,6}$-androstatriene-11β,17α-diol-3-one 9α-methoxy - 16 - methylene-17β-(α,β-oxido-propanoyl)-$\Delta^{1,4,6}$-androstatriene-11β,17α-diol-3-one 9α - ethoxy - 16 - methylene-17β-(α,β-oxido-propanoyl)-$\Delta^{1,4,6}$-androstatriene-11β,17α-diol-3-one The corresponding 11-keto compounds are similarly prepared using as starting materials the 11-keto-21-aldehydes which are also described and claimed in said copending and concurrently filed patent application.

What is claimed is:

1. A compound selected from the group consisting of those having the formula:

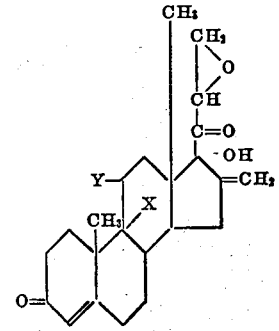

and the $\Delta^1$-, $\Delta^6$- and $\Delta^{1,6}$-dehydro analogs thereof wherein X is selected from the group consisting of hydrogen, halogen, methoxy and ethoxy; Y is selected from the group consisting of keto and β-hydroxyl.

2. A pharmaceutical composition comprising a compound as claimed in claim 1 together with a pharmaceutically acceptable carrier.

No references cited.